United States Patent
Olson et al.

(10) Patent No.: US 6,464,817 B2
(45) Date of Patent: Oct. 15, 2002

(54) POLYOLEFIN BOUND ULTRAVIOLET LIGHT ABSORBERS

(75) Inventors: David B. Olson, May Township; David M. Burns, Woodbury, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/824,303

(22) Filed: Apr. 2, 2001

(65) Prior Publication Data

US 2001/0016241 A1 Aug. 23, 2001

Related U.S. Application Data

(62) Division of application No. 09/371,985, filed on Aug. 11, 1999, now Pat. No. 6,235,375, which is a division of application No. 08/841,062, filed on Apr. 29, 1997, now Pat. No. 6,008,302.

(51) Int. Cl.[7] .............................................. B29C 47/00
(52) U.S. Cl. ............................ 156/244.23; 525/329.7; 525/329.9
(58) Field of Search .................. 156/244.23; 525/329.7, 525/329.9

(56) References Cited

U.S. PATENT DOCUMENTS

| | | |
|---|---|---|
| 3,313,866 A | 4/1967 | Horton et al. |
| 3,441,545 A | 4/1969 | Blatz et al. |
| 3,658,741 A | 4/1972 | Knutson et al. |
| 4,128,536 A | 12/1978 | Brodsky et al. |
| 4,413,096 A | 11/1983 | Fu et al. |
| 4,438,008 A | 3/1984 | Oeder et al. |
| 4,528,311 A | 7/1985 | Beard et al. |
| 4,767,659 A | 8/1988 | Bailey et al. |
| 4,853,471 A | 8/1989 | Rody et al. |
| 4,868,246 A | 9/1989 | MacLeay et al. |
| 4,980,420 A * | 12/1990 | MacLeay et al. ......... 525/329.9 |
| 4,981,914 A | 1/1991 | MacLeay et al. |
| 5,085,918 A | 2/1992 | Rajan et al. |
| 5,128,419 A | 7/1992 | Fong et al. |
| 5,194,113 A | 3/1993 | Lasch et al. |
| 5,196,475 A | 3/1993 | Lences et al. |
| 5,227,194 A | 7/1993 | De La Sierra E. |
| 5,985,079 A * | 11/1999 | Ellison .................. 156/244.23 |

FOREIGN PATENT DOCUMENTS

| | | |
|---|---|---|
| JP | 60-084378 | 5/1985 |
| JP | 04-298505 | 10/1992 |
| WO | WO 91/09063 | 6/1991 |

OTHER PUBLICATIONS

Vogl et al., "New developments in specialty polymers: polymeric stabilizers," *Polymer*, Aug. 1985, V. 26, pp. 1288–1296.

*Encyclopedia of Polymer Science and Engineering*, John Wiley & Sons, 1981, V. 6, pp. 383–429.

Ghiggino et al., "Photophysics of Polymer–Bound 2–(2'–Hydroxyphenyl)–2H–Benzotriazole Photostabilizers," *Journal of Polymer Science*, 1988, V. 26, pp. 505–510.

Konstantinova et al., "Synthesis and application of UV stabilizers for polymeric materials based on triazinylaminobenzotriazole," *Polymer Degradation and Stability*, 1994, V. 43, pp. 187–193.

Lucki et al., "Surface photografting of polymerizable 2–(2–hydroxyphenyl)2H–benzotriazoles as ultra–violet stabilizers," *Polymer*, Sep. 1990, V. 31, pp. 1772–1781.

Vogl et al., "Polymerizable, Polymeric, and Polymer–Bound (Ultraviolet) Stabilizers," *American Chemical Society*, 1985, pp. 197–210.

Bailey et al., "Polymeric Ultraviolet Absorbers," *J. Macromol. Sci.–Rev.*, 1976, C14(2), pp. 267–293.

Hu et al., "Exchange and Free Radical Grafting Reactions in Reactive Extrusion," *Makromol. Chem., Macromol. Symp.*, 1993, V. 75, pp. 137–157.

Tirrell, et al., "Polymers With Ultraviolet Absorbers as Functional Groups," *Polymer Preprints, ACS Division of Polymer Chemistry*, 1977, 18(1), pp. 542–546.

Abstract of JP 92–236384, Aug. 1992.

* cited by examiner

Primary Examiner—John J. Gallagher
(74) *Attorney, Agent, or Firm*—Carolyn A. Fischer

(57) ABSTRACT

Oligomeric materials contain ultraviolet light absorbing compounds that are covalently bound to the oligomer backbone through an ester or amide linkage. These ultraviolet light absorbing oligomers may be combined with polymers such as polyolefins to provide protection against the harmful effects of ultraviolet light.

10 Claims, No Drawings

POLYOLEFIN BOUND ULTRAVIOLET LIGHT ABSORBERS

This application is a division, of U.S. Application Ser. No. 09/371,985, filed Aug. 11, 1999, now U.S. Pat. No. 6,235,375, which is a division of U.S. Application Ser. No. 08/841,062, filed Apr. 29, 1997, issued as U.S. Pat. No. 6,008,302.

FIELD OF THE INVENTION

This invention relates to oligomers that contain ultraviolet light absorbing compounds (UVAs) covalently bound to the oligomeric backbone. The invention also relates to stabilization of polymers or other substrates against photochemical degradation by use of the oligomers.

BACKGROUND OF THE INVENTION

Many plastics tend to degrade when exposed to sunlight or other sources of ultraviolet (UV) light. This exposure results in, for example, loss of tensile strength, embrittlement, and discoloration. To help prevent such degradation, ultraviolet light stabilizers are often incorporated into a polymer composition, which is used as a protective top layer for underlying materials. These uv light stabilizers perform well but are often not stable in or compatible with the polymer, which results in the stabilizer leaving the polymer by leaching, migration, vaporization, or other means. When the uv stabilizer levels are lowered in this manner, their protective effect is diminished, leading to degradation of the polymer and the underlying materials.

Molecules that function as ultraviolet light absorbers are generally known in the art. For example, in U.S. Pat. No. 4,853,471 Rody et al. describe 2(2-hydroxyphenyl)-benzotriazole compounds that are useful as ultraviolet light absorbers. These compounds are described as useful in the stabilization of a wide variety of polymeric materials against ultraviolet light, particularly those that are used in the preparation of photographic materials. Other classes of ultraviolet light absorbers include the 2-hydroxybenzophenones and the diphenylcyanoacrylates.

While such compounds are known to absorb ultraviolet light, their incompatibility with the polyolefins often used as the top film in multilayer sheetings has limited their usefulness in such constructions. The low solubility and high mobility of typical ultraviolet light absorbers in polyolefins results in an inability to maintain high levels of these compounds in polyolefin films; the compounds tend to bloom or migrate out of the film, and the protective properties of the compounds are lost.

Much effort has been directed to the development of methods of maintaining the uv stabilizer compound in a selected polymeric matrix. Ultraviolet light stabilizers have been developed that have polymerizable functionalities. The polymerizable stabilizer is then incorporated into the polymer as a co-monomer or copolymerized with another monomer to form a stabilizing polymer that can be added to the desired polymer. Because the stabilizing compound is then part of the polymer backbone, it remains in the polymer composition and the stabilizing benefits are retained for a longer period of time. Examples of incorporation of a stabilizing monomer into a polymer backbone may be found in, for example, Vogl et al., POLYMER, Vol. 26, p. 1288 (1985); U.S. Pat. Nos. 3,313,866 (Horton et al.), 4,128,536 (Brodsky et al.), and 4,528,311 (Beard et al.).

There has also been development in the area of "attaching" the ultraviolet light absorbing compound to a polymer backbone by selecting UV light absorbers with groups that react with various functionalities present on the polymer. Fu et al., in U.S. Pat. No. 4,413,096, describe α-olefin copolymers wherein hindered amine light stabilizers are pendant to the polymer backbone. The Fu copolymers may be prepared by transesterification of the polymer with the hindered amine light stabilizing compound.

There is a continuing need in the art for a method of stabilizing polymers such as polyolefins with ultraviolet light absorbing compounds that provides lasting protection both to the polyolefin and to articles that incorporate the polyolefin.

SUMMARY OF THE INVENTION

We have found that hydroxy or amine functional ultraviolet light absorbing compounds may be covalently bound to a carboxyl functional oligomer. This covalent bonding allows us to deliver a compatible non-fugitive UV absorber to polyolefin type polymers. Accordingly, the invention provides an ultraviolet light absorbing oligomer made up of an ultraviolet light absorbing oligomer comprising the reaction product of a carboxyl functional oligomer and a hydroxy or amine functional ultraviolet light absorbing compound, wherein the ultraviolet light absorbing compound is a group of formula (I), (II), (III), or (IV):

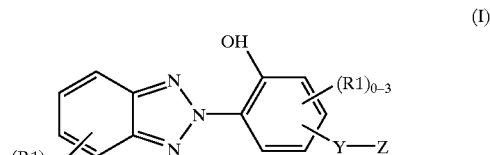

(I)

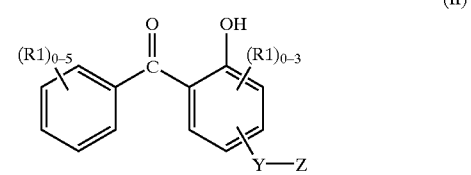

(II)

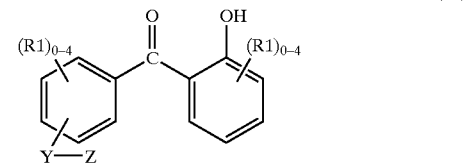

(III)

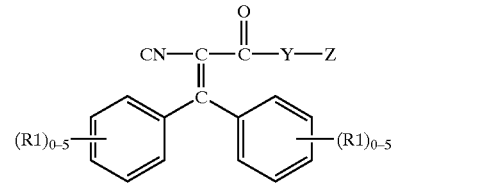

(IV)

wherein each R1 is independently halogen, hydroxy, straight-chain or branched $C_{1-12}$ alkyl, straight-chain or branched $C_{2-12}$ alkenyl, straight-chain or branched $C_{1-12}$ alkoxy, straight-chain or branched $C_{2-12}$ alkenyloxy, straight-chain or branched $C_{1-12}$ alkanol, amino, straight-chain or branched $C_{1-12}$ alkylamino, or straight-chain or branched $C_{1-12}$ dialkylamino; Y is a $C_{1-18}$ alkylene or $C_{2-18}$ alkenylene group which may be straight-chain or branched and which may be interrupted by one or more

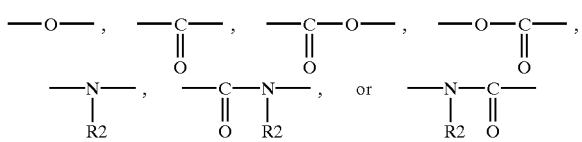

wherein each R2 is independently H or $C_{1-6}$ alkyl that may be straight-chain or branched; and Z is —OH or —NH$_2$.

The invention also provides polymer compositions that contain the UV light absorbing oligomer and a polyolefin, and articles such as retroreflective sheetings, conformable pavement markers, and signs that contain films made of the polymer composition.

In one such aspect the invention provides a conformable marking sheet comprising a top polymeric film layer having glass microspheres and skid resistant particles partially embedded therein, the film comprising a polyolefin and the ultraviolet light absorbing oligomer of the invention; a base layer comprising a deformable thermoplastic polymer and a nonreinforcing mineral particulate; a pressure sensitive adhesive layer; and a release liner.

In another aspect of the invention is provided an enclosed-lens retroreflective sheeting comprising a layer of lenses anchored in a binder layer, a specularly reflective layer underlying the lenses, and a top layer comprising a polymeric film, said film comprising a polyolefin and the ultraviolet light absorbing oligomer of the invention.

All percentages are weight percentages based on total composition weight unless otherwise specified.

DETAILED DESCRIPTION OF THE INVENTION

The UV light absorbing oligomers of the invention are generally prepared by reacting a carboxyl bearing oligomer with a hydroxy or amine functional ultraviolet light absorbing compound. The carboxyl functional oligomer contains at least one monomer having a pendant carboxyl (—COOH) group. Carboxyl functional oligomers useful in the formation of the UV light absorbing oligomers of the invention typically have a weight average molecular weight of about 100 to 10,000, preferably about 1000 to 3500. The acid number (mg KOH required to neutralize 1 gram of the oligomer) of the oligomer is generally about 40 to 180.

Monomers useful in the formation of the carboxyl functional oligomer include ethylenically unsaturated carboxylic acids. The carboxyl functional oligomer may be a homopolymer or copolymer of such carboxy bearing monomers. The copolymer may contain different carboxy bearing monomers, or may contain a carboxy bearing monomer and a non-carboxy bearing monomer. Examples of useful types of non-carboxy bearing monomers include ethylenically unsaturated carboxylic acid esters, olefins, vinyl compounds, and the like.

Suitable ethylenically unsaturated carboxylic acids include alkenoic and aralkenoic mono- di- and tri- carboxylic acids having up to 20 carbon atoms as well as acids having higher numbers of carboxyl groups. Examples of such acids include acrylic acid, methacrylic acid, fumaric acid, maleic acid, crotonic acid, itaconic acid and cinnamic acid. Of these, acrylic acid and methacrylic acid are preferred.

Comonomers that may be used in the preparation of the carboxyl functional polymer include olefins such as ethylene, propylene, and butylene; ethylenically unsaturated aromatic monomers that contain up to 20 carbon atoms such as styrene and vinyl tolulene; ethylenically unsaturated esters of carboxylic acids that contain a total of up to 20 carbon atoms such as vinyl acetate; and the like. Of these, the olefins are a preferred class of comonomer, and ethylene is particularly preferred.

The carboxyl functional oligomer may be an oligomer having randomly recurring structural units of the formula (V):

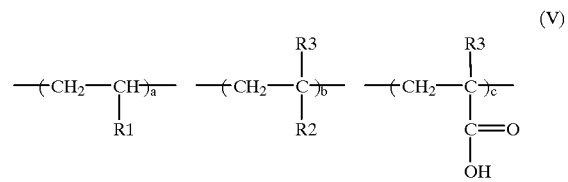

wherein R3 is H or $C_{1-18}$ alkyl which may be straight or branched;

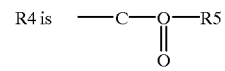

each R5 is independently H or $C_{1-6}$ alkyl which may be straight or branched; and a, b, and c are selected to provide a weight average molecular weight of about 100 to 10,000, provided that c is at least one.

Ethylene-acrylic acid copolymer having a weight average molecular weight of about 1000 to 3500 is a particularly preferred carboxyl functional oligomer. Commercially available examples of preferred ethylene-acrylic acid copolymers include the A-C® copolymers available from Allied Signal Inc., Morristown, N.J.

The carboxyl functional oligomer can be prepared using polymerization methods known in the art. See, for example, Knutson et al., U.S. Pat. No. 3,658,741, which is incorporated herein by reference. Detailed information on polymer and oligomer preparation may be found, for example, in the *Encyclopedia of Polymer Science and Engineering*, Vol. 6, Wiley & Sons 1986, pp. 383–429.

The carboxyl functional oligomer is reacted with one or more hydroxy or amine functional ultraviolet light absorbing compounds to produce the UV light absorbing oligomer of the invention. In addition to absorbing ultraviolet light, the ultraviolet light absorbing compounds useful in the invention are preferably transparent to visible light. Useful classes of hydroxy and amine functional ultraviolet light absorbing compounds include hydroxy and amine containing 2-hydroxyphenylbenzotriazoles, 2-hydroxybenzophenones, and diphenylcyanoacrylates.

Any 2-hydroxyphenylbenzotriazole ultraviolet light absorbing compound that contains a terminal hydroxy or amine group may be used in the material of the invention. Suitable 2-hydroxyphenylbenzotriazole compounds include those having formula (I):

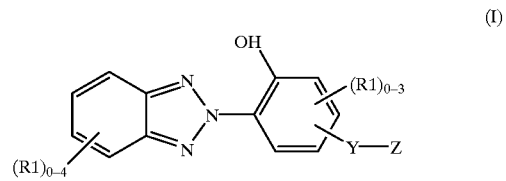

wherein each R1 is independently halogen, hydroxy, straight-chain or branched $C_{1-12}$ alkyl or $C_{2-12}$ alkenyl, straight-chain or branched $C_{1-12}$ alkoxy, straight-chain or branched $C_{2-12}$ alkenyloxy, straight-chain or branched $C_{1-12}$ alkanol, amino, straight-chain or branched $C_{1-12}$ alkylamino, or straight-chain or branched $C_{1-12}$ dialkylamino; Y is a $C_{1-12}$ alkylene or $C_{2-12}$ alkenylene group that may be straight or branched and that may be interrupted by one or more —O—, —C(O)—, —C(O)O—, —OC(O)—, —NR2—, —C(O)NR2—, or —NR2C(O) groups; and Z is OH or $NH_2$; and R2 is H or $C_{1-6}$ alkyl which may be straight or branched;

Of these, 2-hydroxyphenylbenzotriazole compounds having formula (Ia) are preferred:

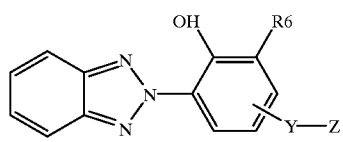

(Ia)

wherein R6 is H or $C_{1-4}$ alkyl which may be straight or branched.

Another useful class of ultraviolet light absorbing compounds is the 2-hydroxybenzophenones. So long as they contain a terminal hydroxy or amine group, any 2-hydroxybenzophenone ultraviolet light absorbing compound may be used. Examples of 2-hydroxybenzophenone compounds that may be used in the invention include those of formula (II) and (III):

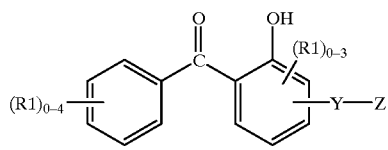

(II)

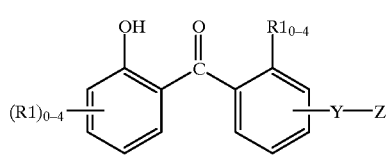

(III)

wherein each R1 is independently halogen, hydroxy, straight-chain or branched $C_{1-12}$ alkyl, straight-chain or branched $C_{2-12}$ alkenyl, straight-chain or branched $C_{1-12}$ alkoxy, straight-chain or branched $C_{2-12}$ alkenyloxy, straight-chain or branched $C_{1-12}$ alkanol, amino, straight-chain or branched $C_{1-12}$ alkylamino, or straight-chain or branched $C_{1-12}$ dialkylamino; Z is OH or $NH_2$; and Y is a $C_{1-12}$ alkylene or alkenylene group that may be straight-chain or branched and that may be interrupted by one or more —O—, —C(O)—, —C(O)O—, —OC(O)—, —NR2—, —C(O)NR2—, or —NR2C(O) groups wherein R2 is H or $C_{1-6}$ alkyl that may be straight-chain or branched.

Examples of particular 2-hydroxybenzophenone compounds usefull in the invention include compounds of formulas (IIa) or (IIIa):

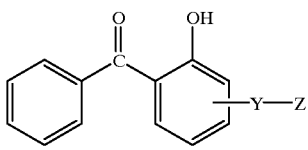

(IIa)

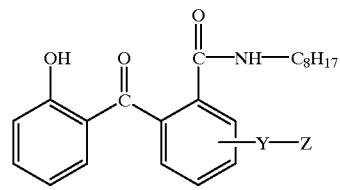

(IIIa)

wherein the octyl group may be straight-chain or branched.

Diphenylcyanoacrylate ultraviolet light absorbing compounds may also be used, so long as they contain a terminal hydroxy or amine group. Examples of useful diphenylcyanoacrylate compounds include those of formula (IV):

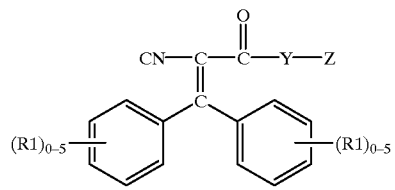

(IV)

wherein each R1 is independently halogen, hydroxy, straight-chain or branched $C_{1-12}$ alkyl, straight-chain or branched $C_{1-12}$ alkenyl, straight-chain or branched $C_{1-12}$ alkoxy, straight-chain or branched $C_{1-12}$ alkenyloxy, straight-chain or branched $C_{1-12}$ alkanol, amino, straight-chain or branched $C_{1-12}$ alkylamino, or straight-chain or branched $C_{1-12}$ dialkylamino; Z is OH or $NH_2$; and Y is a $C_{1-12}$ alkylene or alkenylene group that may be straight or branched and that may be interrupted by one or more:—O—, —C(O)—, —C(O)O—, —OC(O)—, —NR2—, —C(O)NR2—, or —NR2C(O) groups; and R2 is H or $C_{1-6}$ alkyl which may be straight-chain or branched.

Dimers of any of these ultraviolet light absorbing compounds can be used as well.

Other ultraviolet light absorbing compounds may also be used, provided they contain a terminal hydroxy or amine group. Examples of such compounds include p-hydroxybenzoates and triazines. The hydroxy or amine functional ultraviolet light containing compounds may be used alone or in combination in the oligomers, materials and films of the invention.

The UV light absorbing oligomers of the invention are prepared by reacting the carboxyl functional oligomer with the hydroxy or amine functional ultraviolet light absorbing compound. No solvent is necessary, as the reaction may be carried out in the molten or liquid oligomer, but an organic solvent may be used if desired.

In general the reaction is carried out by combining the carboxyl functional oligomer, the hydroxy or amide functional UV light absorbing compound and an appropriate catalyst in a reaction vessel. The mixture is heated with stirring until the oligomer melts. Stirring at an elevated temperature, e.g. 220–240° C. may be continued until no unreacted UVA remains. The reaction mixture is monitored by TLC (Thin Layer Chromatography) or other suitable means until the reaction is determined to be complete.

The carboxyl functional oligomer and the hydroxy or amine functional UV light absorbing compound are present in proportions selected to provide the desired amount of UV light absorber loading in the oligomer. Levels of about 2 to 25 wt-% based on the total oligomer weight are preferred, although higher or lower levels may be used depending on the particular end use.

The reaction is carried out in the presence of an effective esterification catalyst, such as dibutyl tin oxide, dibutyl tin hydroxide, butyl tin oxide hydroxide, stannous octoate, lithium ricinoleate and bismuth neodecanoate. The preferred catalyst is butyl tin oxide hydroxide (available as FASTCAT 4100 from Atochem North America, Inc., Philadelphia, Pa.). The catalyst generally makes up about 0.01 to 5.0 wt-% of the reaction mixture, preferably about 0.1 to 1.0 wt-%, although slightly more or less may be required depending on the particular catalyst employed.

The ultraviolet light absorbing oligomer thus formed may be used as is or blended into polymers such as polyolefins which may be further processed as desired. For example, they may be formed into films that are durable and provide protection to underlying substrates or materials against the harmful effects of ultraviolet light.

The polymeric material of the invention is made by combining the ultraviolet light absorbing oligomer of the invention with a polymer such as a polyolefin. Because it is covalently bound to the oligomer, the ultraviolet light absorber does not bloom or migrate out of the polymer, thereby increasing the useful life of articles that are constructed using films made of the material.

Polyolefins that may be used in the polymeric material of the invention include polymers that are made from at least one olefinic monomer. Examples of such olefinic monomers include ethylene, propylene, butylene, styrene, and the like, with ethylene the preferred olefinic monomer.

The polyolefin may be a homopolymer of the olefinic monomer, or it may be a copolymer of different olefinic monomers or of an olefinic monomer and another monomer. The comonomer may be any monomer that can be co-polymerized with the olefinic monomer, so long as it does not result in incompatibility with the UV light absorbing oligomer. Useful types of comonomers include ethylenically unsaturated carboxylic acids; ethylenically unsaturated carboxylic acid esters; and vinyl containing monomers. The ethylenically unsaturated carboxylic acids are a preferred class of comonomers, with acrylic acid especially preferred.

The polymeric material is prepared by combining the UV light absorbing oligomer of the invention with a polyolefin. The UV light absorbing oligomer is generally present in an amount high enough to provide protection from ultraviolet light, but not so high that the material migrates, separates, or blooms out of the polyolefin. Typically the polymeric material contains a sufficient amount of the UV light absorbing oligomer to provide about 0.05 to 50 wt-%, preferably about 1 to 20 wt-% of the ultraviolet light absorbing compound in the material based on the total material weight.

The polymeric material may be prepared by blending a melt of the polyolefin with a melt of the UV light absorbing oligomer with stirring until the mixture is uniform. After uniformity is achieved,. the mixture may be pressed or formed into a film or other shape using methods known in the art. The film may also be prepared by co-extruding the polyolefin polymer and the UV light absorbing oligomer directly into a film.

Films containing the polymeric material of the invention may be used as the top layer or cover film of a multilayered retroreflective sheeting. Retroreflective sheetings are generally known in the art, as seen for example in Bailey et al., U.S. Pat. No. 4,767,659, which is incorporated herein by reference. The polymeric films provide protection to the lower layers of the sheeting from ultraviolet light, thereby extending the useful life of the sheeting and articles that incorporate the sheeting.

In addition to providing protection from ultraviolet light, when used as the top layer of a retroreflective sheeting, the polymeric film should be sufficiently extensible to withstand substantial stretching such as the embossing of a license plate, sufficiently soft that it resists localized delamination when stretched to conform to an irregular surface, and should have good impact resistance. Preferably, when used as the top layer of a retroreflective sheeting the polymeric film has an elongation of at least about 100%, good impact resistance, toughness, and transparency.

Retroreflective sheetings that contain the polymeric film of the invention as a top layer typically contain multiple layers. One example of a suitable retroreflective sheeting is a sheeting article that contains a binder layer; a layer of glass microspheres fully or partially embedded in the binder layer; a specularly reflective layer, and an adhesive layer covered by a removable liner. Other layers may be present as desired.

To prepare a retroreflective sheeting using the polymeric film of the invention, the film is laminated to a retroreflecting base material that contains multiple layers as described above.

The retroreflective sheetings prepared using the polymeric film of the invention may be applied to a wide variety of articles, including traffic signs, barriers, and cones, as well as embossed license or information plates. The preparation of embossed information plates is described in U.S. Pat. Nos. 5,085,918 and 5,227,194, both of which are incorporated herein by reference.

The films of the invention may also be used in the preparation of conformable pavement marking sheets. Such conformable marking sheets are described in Lasch et al., U.S. Pat. No. 5,194,113, which is incorporated herein by reference.

When used in the preparation of a conformable marking sheet, the polymeric film should be sufficiently ductile to allow the sheet to conform to the surface of the pavement or other substrate in order to improve the adhesion of the sheet to the substrate. When used as a top layer in a conformable marking sheet, the polymeric film preferably includes a visibility enhancing pigment such as titanium dioxide or lead chromate.

The polymeric film top sheet or layer may be extruded or laminated directly onto the other layers of the conformable sheet, or an adhesive or other layer may be interposed between the top layer and other layers of the sheet.

The polymeric films of the invention may also be used as a marking sheet independent of a conforming layer. If used in this manner, the polymeric film may be laminated to a layer of pressure sensitive adhesive to improve adhesion to the pavement or other substrate. A release liner may also be present to provide ease of handling and storage. In addition, particles may be fully or partially embedded in the top surface of the film to improve the retroreflectivity and/or skid resistance properties of the film.

The invention is further described by reference to the following examples, which are understood to be illustrative only and not limiting of the invention.

EXAMPLES

Example 1

This example utilized Allied-Signal A-C 5120 oligomer, a copolymer of about 15% acrylic acid and 85% ethylene, having a weight average molecular weight of about 1500 and a carboxylic acid equivalent weight of about 475 and Uvinul® X-19, 2-hydroxy-4(2-hydroxyethoxy) benzophenone, available from BASF Inc., Ludwigshafen, Germany.

To prepare the ultraviolet light absorbing oligomer, 25 g of A-C 5120 was placed in a 100 ml, 3-necked round bottom flask. Ten grams of the Uvinul® X-19 and 0.008 g of Fastcat® 4100 butyl tin hydroxide catalyst were added, without use of a solvent. The reaction mixture was stirred and heated to 150° C., when homogeneous melt was formed. A nitrogen sparge was added beneath the liquid level, heating was continued until the temperature reached 220° C., and the mixture was held at 220–230° C., with stirring, for 4 hours. After 4 hours TLC (50% ethyl acetate/50% hexanes) showed little unreacted benzophenone. The molten mixture was poured from the flask into an aluminum pan and allowed to cool to room temperature.

Example 2

Twenty-five grams of the product of Example 1 in pulverized form was dry blended with 490 g of Primacor® 3440 (polyethylene-co-acrylic acid), available from Dow Chemical, Midland, Mich.). The blend was extruded onto a polyester carrier as a nominal 2 mil (51 microns) film, and the temperature profile was Zone 1—350° F. (177° C.), Zone 2—380° F. (193° C.), Zone 3 and die—420° F. (216° C.). Melt temperature was 306° F. (152° C.). Extrusion took place on a Haake ¾" single screw extruder. The UVA loading of the film was 1.2 wt-%.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method of protecting a substrate from the effects of ultraviolet light, the method comprising applying a polymeric film to the substrate, said film comprising a polyolefin and the reaction product of a carboxyl functional oligomer and a hydroxy functional ultraviolet light absorbing compound, wherein the ultraviolet light absorbing compound is of formula (I) or (IV):

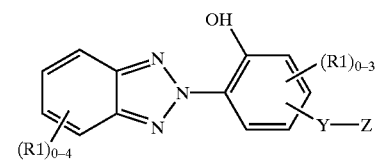

(I)

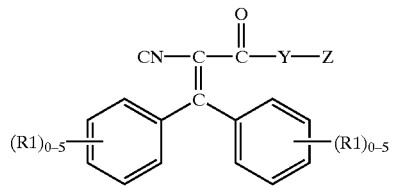

(IV)

wherein each R1 is independently halogen, hydroxy, straight-chain or branched $C_{1-12}$ alkyl, straight-chain or branched $C_{2-12}$ alkenyl, straight-chain or branched $C_{1-12}$ alkoxy, straight-chain or branched $C_{2-12}$ alkenyloxy, straight-chain or branched $C_{-1-12}$ alkanol, amino, straight-chain or branched $C_{1-12}$ alkylamino, or straight-chain or branched $C_{1-12}$ dialkylamino; Y is a $C_{1-18}$ alkylene of $C_{2-18}$ alkenylene group which may be straight-chain or branched and which may be interrupted by one or more

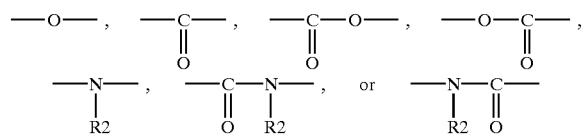

wherein each R2 is independently H or $C_{1-6}$ alkyl that may be straight-chain or branched; and Z is —OH.

2. The method of claim 1 wherein the polyolefin comprises an ethylene-acrylic acid copolymer.

3. The method of claim 1 wherein the carboxyl functional oligomer comprises an ethylene-acrylic acid copolymer.

4. The method of claim 1 wherein the carboxyl functional oligomer comprises acid, methacrylic acid, or a copolymer thereof.

5. The method of claim 1, wherein the compound of formula (I) or (IV) comprises about 1 to 25 wt-% of the oligomer.

6. The method of claim 1, wherein at least one ultraviolet light absorbing compound is of formula (I).

7. The method of claim 1, wherein at least one ultraviolet light absorbing compound is of formula (Ia):

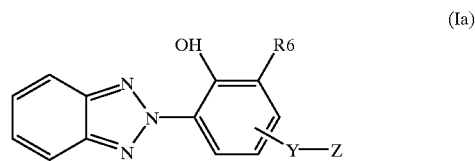

(Ia)

wherein R6 is H or $C_{1-4}$ alkyl which may be straight or branched.

8. The method of claim 1, wherein at least one ultraviolet light absorbing compound is of formula (IV).

9. The method of claim 1, wherein the substrate comprises a retroreflective sheeting.

10. The method of claim 9, wherein the sheeting is a traffic sign.

* * * * *

UNITED STATES PATENT AND TRADEMARK OFFICE
CERTIFICATE OF CORRECTION

PATENT NO. : 6,464,817 B2
DATED : October 15, 2002
INVENTOR(S) : Olson, David B.

It is certified that error appears in the above-identified patent and that said Letters Patent is hereby corrected as shown below:

Column 7,
Line 61, delete "." following ",".

Column 10,
Line 29, following "comprises" insert -- acrylic --.

Signed and Sealed this

Third Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,464,817 B2
DATED : October 15, 2002
INVENTOR(S) : David B. Olson

It is certified that error appears in the above-identified patent and that said Letters Patent is hereby corrected as shown below:

<u>Column 10,</u>
Line 8, replace "of" with -- or --.

Signed and Sealed this

Thirtieth Day of December, 2003

JAMES E. ROGAN
*Director of the United States Patent and Trademark Office*